(12) United States Patent
Bannister et al.

(10) Patent No.: US 9,199,431 B2
(45) Date of Patent: Dec. 1, 2015

(54) FIBRE-REINFORCED COMPOSITE MOLDING AND MANUFACTURE THEREOF

(75) Inventors: Damian James Bannister, Winchester (GB); Gary Richard Watson, Freshwater (GB)

(73) Assignee: Gurit (UK) Ltd., Newport, Isle of Wright (GB)

( * ) Notice: Subject to any disclaimer, the term of this patent is extended or adjusted under 35 U.S.C. 154(b) by 858 days.

(21) Appl. No.: 12/532,895

(22) PCT Filed: Mar. 26, 2008

(86) PCT No.: PCT/GB2008/001031
§ 371 (c)(1),
(2), (4) Date: Feb. 3, 2010

(87) PCT Pub. No.: WO2008/119941
PCT Pub. Date: Oct. 9, 2008

(65) Prior Publication Data
US 2010/0166998 A1    Jul. 1, 2010

(30) Foreign Application Priority Data

Mar. 29, 2007 (GB) .................................. 0706198.9
Oct. 19, 2007 (GB) .................................. 0720581.8

(51) Int. Cl.
*B29C 45/00* (2006.01)
*B32B 5/12* (2006.01)
(Continued)

(52) U.S. Cl.
CPC .............. *B32B 5/12* (2013.01); *B29C 63/0021* (2013.01); *B29C 66/1122* (2013.01);
(Continued)

(58) Field of Classification Search
CPC ........... B32B 5/12; B32B 5/145; B32B 5/22; B32B 5/24; B32B 5/28; B32B 7/00; B29C 63/0021; B29C 63/0026; B29C 63/003; B29C 63/122

USPC .............. 264/510, 640, 641, 642, 45.1, 45.5, 264/46.4, 46.7, 46.8, 1.7, 440, 471, 480, 264/487, 490, 493, 171.1, 241, 511, 553, 264/566, 571
See application file for complete search history.

(56) References Cited

U.S. PATENT DOCUMENTS

| | | |
|---|---|---|
| 3,730,808 A | 5/1973 | Fekete |
| 4,311,661 A | 1/1982 | Palmer |

(Continued)

FOREIGN PATENT DOCUMENTS

| | | |
|---|---|---|
| DE | 19915083 C1 | 4/2000 |
| DE | 10156123 A1 | 5/2003 |

(Continued)

OTHER PUBLICATIONS

Jun. 19, 2008 International Search Report and Written Opinion in related PCT/GB2008/001030.

(Continued)

*Primary Examiner* — Stella Yi
(74) *Attorney, Agent, or Firm* — Novak Druce Connolly Bove + Quigg LLP (57) ABSTRACT

Method of manufacturing a fiber-reinforced composite molding, the method comprising the steps of: (a) disposing a surfacing layer on a portion of a mold surface, the surfacing layer comprising a first resin material and being in the form of at least one solid sheet; (b) disposing at least one layer of fibrous reinforcing material on the surfacing layer to provide, on the portion of the mold surface, an assembly of the surfacing layer and a structural layer comprising the at least one layer of fibrous reinforcing material; (c) applying a vacuum to the assembly; (d) infusing a flowable second resin material, under the vacuum, into the at least one layer of fibrous reinforcing material; and (e) curing the first and second resin materials to form the fiber-reinforced composite molding which comprises a surface portion formed from the surfacing layer laminated to a structural portion formed from the at least one layer of fibrous reinforcing material and the second resin material.

23 Claims, 3 Drawing Sheets

(51) Int. Cl.

| | |
|---|---|
| *B29C 63/00* | (2006.01) |
| *B29C 65/00* | (2006.01) |
| *B29C 70/08* | (2006.01) |
| *B29C 70/30* | (2006.01) |
| *B29C 70/34* | (2006.01) |
| *B29C 70/36* | (2006.01) |
| *B29C 70/44* | (2006.01) |
| *B29C 70/46* | (2006.01) |
| *B32B 3/04* | (2006.01) |
| *B29C 70/02* | (2006.01) |
| *B29D 99/00* | (2010.01) |
| *F01D 5/28* | (2006.01) |
| *B32B 3/06* | (2006.01) |
| *B32B 5/02* | (2006.01) |
| *B32B 7/02* | (2006.01) |
| *B32B 27/12* | (2006.01) |
| *B29C 65/02* | (2006.01) |
| *B29K 63/00* | (2006.01) |
| *B29K 67/00* | (2006.01) |
| *B29K 105/24* | (2006.01) |
| *B29L 9/00* | (2006.01) |
| *B29L 31/08* | (2006.01) |

(52) U.S. Cl.
CPC .............. *B29C 66/43* (2013.01); *B29C 66/721* (2013.01); *B29C 66/723* (2013.01); *B29C 66/7392* (2013.01); *B29C 70/021* (2013.01); *B29C 70/086* (2013.01); *B29C 70/30* (2013.01); *B29C 70/342* (2013.01); *B29C 70/36* (2013.01); *B29C 70/44* (2013.01); *B29C 70/465* (2013.01); *B29D 99/0025* (2013.01); *B32B 3/04* (2013.01); *B32B 3/06* (2013.01); *B32B 5/022* (2013.01); *B32B 5/028* (2013.01); *B32B 7/02* (2013.01); *B32B 27/12* (2013.01); *F01D 5/282* (2013.01); *B29C 65/02* (2013.01); *B29C 66/128* (2013.01); *B29C 66/727* (2013.01); *B29C 66/7212* (2013.01); *B29C 66/72141* (2013.01); *B29K 2063/00* (2013.01); *B29K 2067/00* (2013.01); *B29K 2105/246* (2013.01); *B29L 2009/00* (2013.01); *B29L 2031/08* (2013.01); *B32B 2250/03* (2013.01); *B32B 2250/04* (2013.01); *B32B 2603/00* (2013.01); *Y10T 428/187* (2015.01); *Y10T 428/192* (2015.01); *Y10T 428/195* (2015.01); *Y10T 428/197* (2015.01); *Y10T 428/24132* (2015.01); *Y10T 428/24488* (2015.01); *Y10T 428/24942* (2015.01); *Y10T 428/249942* (2015.04)

(56) References Cited

U.S. PATENT DOCUMENTS

| | | | |
|---|---|---|---|
| 5,104,718 A | | 4/1992 | Asada et al. |
| 5,213,713 A | | 5/1993 | Reitz |
| 5,766,541 A | | 6/1998 | Knutsson et al. |
| 6,527,894 B1 | | 3/2003 | Rocker et al. |
| 6,582,792 B1 | * | 6/2003 | Godbehere et al. ............ 428/57 |
| 2003/0219578 A1 | * | 11/2003 | Jones et al. ................ 428/292.1 |
| 2004/0256053 A1 | * | 12/2004 | Burpo et al. ................... 156/285 |
| 2004/0265406 A1 | | 12/2004 | Lorenz et al. |
| 2006/0027314 A1 | * | 2/2006 | Jones et al. .................... 156/245 |

FOREIGN PATENT DOCUMENTS

| | | |
|---|---|---|
| EP | 1400341 A | 3/2004 |
| EP | 1504888 A | 2/2005 |
| EP | 1625929 A1 | 2/2006 |
| EP | 1731282 A1 | 12/2006 |
| GB | 2198386 A | 6/1999 |
| GB | 2369597 A | 6/2002 |
| GB | 2401081 A | 3/2004 |
| GB | 2433466 A | 6/2007 |
| JP | 2162017 | 6/1990 |
| JP | 03006093 A | 1/1991 |
| JP | 20110464406 A | 3/2001 |
| WO | WO 98/38031 A1 | 9/1998 |
| WO | WO 00/27632 A1 | 5/2000 |
| WO | WO 00/27632 A2 | 5/2000 |
| WO | WO 00/56524 A1 | 9/2000 |
| WO | WO 02/28624 A1 | 4/2002 |
| WO | WO 02/090087 A2 | 11/2002 |
| WO | WO 02/090089 A1 | 11/2002 |
| WO | WO 02/094564 A1 | 11/2002 |

OTHER PUBLICATIONS

Jul. 16, 2008 International Search Report and Written Opinion in related PCT/GB2008/001031.
Jun. 17, 2008 International Search Report and Written Opinion in related PCT/GB2008/001032.
Jul. 26, 2007 GB Search Report in related GB 0706198.9.
Aug. 29, 2008 GB Search and Examination Report in related GB 0720581.8.
Aug. 29 GB Search and Examination Report in related GB 0720585.9.
Apr. 15, 2008 GB Search and Examination Report in related GB 0720583.4.

* cited by examiner

FIBRE-REINFORCED COMPOSITE MOLDING AND MANUFACTURE THEREOF

FIELD OF THE INVENTION

The present invention relates to a method of manufacturing a fibre-reinforced composite moulding and to a fibre-reinforced composite moulding. In particular, the present invention relates to a fibre-reinforced composite moulding suitable for manufacturing large composite structures, such as turbine blades, bridges and boat hulls.

BACKGROUND

Most fibre reinforced composite components require an outer surface coating to provide an aesthetic and protective finish to the component. Traditionally such components are either painted after moulding or a liquid in-mould coating (gelcoat) with sufficient environmental resistance is used. In some applications painting is preferred, especially when multiple component parts need to be assembled together and any misalignment or joint lines can thereafter be hidden by filling and fairing steps to give a more seamless finish. Painting can also be useful when the final colour has not been defined at the start of the build and the parts can be supplied in a ready to paint format.

A key problem in painting a fibre composite part can be that of preventing the fibre reinforcement pattern appearing in the final surface. This is more of a problem when heavier weight, lower cost reinforcement fibres and fabrics are used to reduce the material cost and the time taken to build up the thickness of the laminate. It is common to use a more expensive lower weight glass fibre layer or a non-structural surfacing tissue in addition to a gelcoat layer to buffer the paint from the fibre reinforcement. It is usual practice to first apply a liquid gelcoat into the mould, which in this case is designed to be easy to sand and repair any defects prior to painting. The gelcoat provides a resin barrier layer between the paint and the first fibre layers by providing a sufficient thickness to stop the fibre pattern showing in the final surface. If the laminate is applied into the mould without the gelcoat barrier coat it is common for the final surface to have pin-hole like defects. Pin-holes are a particular problem when painting as they can be hard to spot on the initial moulding, but when the part is painted, the paint then reticulates to form a larger defect around the pin-hole, requiring rework.

Even when using the gelcoat, it is also the case that sometimes a few pin-holes are present. It would be desirable to have a manufacturing process that substantially completely eliminated the problem of pin-holes.

To apply a gelcoat to larger parts, such as wind turbines, marine craft, architectural mouldings, and bridges additional equipment, such as gelcoat spraying machines and extraction equipment, or mixing equipment used in combination with manual brushing or rolling, is needed to reduce defects and achieve reasonable deposition rates of the gelcoat. A time delay then occurs while waiting for the gelcoat to partially cure to build sufficient strength for the remaining laminate to be added on the mould.

The three main thermoset composite processing methods currently used for manufacturing wind turbine blades are:
1. wet-laminating (also known as open moulding)—in this method, the thermoset resin can cure in ambient conditions, but the tools are usually heated to elevated temperature, 50-90° C., to speed up the resin curing process;
2. the use of pre-preg materials, and the Applicant's own & pre-impregnated dry touch composite material sold under the product name SPRINT®—such materials are typically cured at an elevated temperature between 85° C. to 120° C.; and
3. vacuum assisted resin transfer moulding (also known as VARTM, resin infusion, or vacuum infusion)—in this method liquid resin is infused under a vacuum into a dry fibre composite, and then can cure in ambient conditions, although the tools (i.e. the moulds) are usually heated to an elevated temperature between 50-90° C. to speed up the curing process.

The surface finish quality plays an important role in the aerodynamic efficiency. Some blade manufacturers apply a weather resistant in-mould gelcoat to be the final surface layer, others manufacture spray-paint the blades afterwards. In either case the surface needs to be smooth and defect free. The blade manufacturers currently spend a considerable amount of time filling and fixing the blade surfaces and with the increase demand of wind turbine blades, a solution to decrease the amount of time each blade spends in the finishing production area would save time, reduce cost and increase the production capacity.

VARTM is an attractive process for manufacturing blades due to initial low equipment set-up up cost, improved laminate quality, and health and safety. The usual practice to prepare a VARTM blade for painting is to first apply an in-mould gelcoat coat to give a buffer layer between the paint and the fibre reinforced laminate to prevent cosmetic defects. This in-mould coat then builds in viscosity to form a tacky layer, which is useful to secure the first ply of dry reinforcement fibre as it is difficult to secure dry fabrics against the released tool surface with the usual adhesive spray tack or adhesive tape systems used in the remainder of the fibre stack. On small parts not requiring significant fabric adhesion to the tool, a gelcoat can be replaced by tissues, which become impregnated with resin during the infusion. This is not practical on larger parts which are prone to defects caused by air leaks which tend to accumulate in these layers and even minor air leaks requiring extensive re-work to prepare the component for painting.

Although wet-laminating and VARTM resin systems do cure at ambient conditions in production processes, the tools are often heated to 50-90° C. to speed up the curing process and improve the final mechanical properties. In this case it is possible to combine a catalytic thermoset surface resin film with an ambient curing resin system to achieve a co-cured laminate with a high quality surface finish.

WO 02/094564 discloses a prepreg surface film material which is designed to provide a resin layer which is easy to prepare for painting. However, such pre-preg parts are not suitable for use in resin infusion processes that are widely used to manufacture composite parts.

WO-A-2000/056524 discloses a fibre reinforced composite comprising a fibre reinforcement layer having a first matrix located from a first surface of the fibre reinforcement to a depth only partially through the fibre reinforcement; and a thermoset resin matrix located from a second surface of the fibre reinforcement only partially through the fibre reinforcement and a corresponding method are disclosed. The first matrix material may be a thermoplastic or a thermoset. The first and second matrices may be the same. The fibre reinforcement layer may be fully wetted. Also disclosed is a method of manufacturing a fibre reinforced composite whereby the fibre reinforcement layer and first matrix are enclosed in an envelope; and a second matrix material is injected into the envelope, the second matrix material being a thermoset resin matrix, whereby the second matrix infuses into the second surface of the fibre reinforcement layer. However, this does not disclose how to achieve a high quality surface ready for painting.

There is a need in the art for a fibre-reinforced composite moulding, and method of manufacture thereof, that can readily be painted to achieve a high surface finish without requiring a gelcoat.

SUMMARY OF THE INVENTION

According to a first aspect of the present invention there is provided a method of manufacturing a fibre-reinforced composite moulding, the method comprising the steps of:
(a) disposing a surfacing layer on a portion of a mould surface, the surfacing layer comprising a first resin material and being in the form of at least one solid sheet;
(b) disposing at least one layer of fibrous reinforcing material on the surfacing layer to provide, on the portion of the mould surface, an assembly of the surfacing layer and a structural layer comprising the at least one layer of fibrous reinforcing material;
(c) applying a vacuum to the assembly;
(d) infusing a flowable second resin material, under the vacuum, into the at least one layer of fibrous reinforcing material; and
(e) curing the first and second resin materials to form the fibre-reinforced composite moulding which comprises a surface portion formed from the surfacing layer laminated to a structural portion formed from the at least one layer of fibrous reinforcing material and the second resin material.

According to a second aspect of the present invention there is provided a fibre-reinforced composite moulding comprising a surface portion laminated to a structural portion, the surface portion being formed of a surfacing layer comprising a plurality of surfacing layer segments moulded together to faun a continuous surfacing layer, the surfacing layer comprising a first cured resin material supported on a carrier of a sheet material, and the structural portion being formed from at least one layer of fibrous reinforcing material and a cured second resin material, the first and second resin materials having respective compositions such that the viscosity of the uncured first resin material is higher than the viscosity of the uncured second resin material.

In a preferred embodiment of the present invention there is provided a thermoset fibre reinforced structural moulding material containing an integrated surface primer resin layer with air venting properties that enables faster production of large painted moulded composite parts. It gives a defect free surface from resin infusion processing that is easy to prepare for painting.

The preferred embodiment of the present invention provides a manufacturing process that substantially completely eliminated the problem of pin-holes that is encountered in known processes, including the known use of a gelcoat.

The material itself of the preferred embodiment of the present invention contains a layer of thermosetting surface resin, dry reinforcement fibre, and thermosetting structural resin. The surface primer resin lager pieces are overlapped to increase the total air venting properties of the material and to achieve a defect-free surface finish when a large component is to be formed from many overlapping pieces of material to cover the full surface of the mould. This overlap can be in the range of from 10 to 75 mm with a preferable dimension being from 20 to 40 mm. The overlap may be in one direction, or in two mutually oriented directions, which may be orthogonal.

The surfacing layer, optionally being tacked to a layer of dry fibre reinforcement for use in producing composite laminates in accordance with the preferred embodiments of the present invention, is tolerant to handling pressure and is stable enough to be provided on large rolls without losing its air venting properties. It provides a high quality surface direct from the mould, which only requires minimal sanding prior to painting. Considerable time and cost is saved in the production process as this material replaces the first structural layer and liquid gelcoat layer. The material requires no de-bulking operations to remove trapped air and is cured at the same time as the main structural laminate, saving further time in the manufacturing process.

In the process of the preferred embodiments of the present invention a good surface finish is obtained without the need for additional tissues and high cost fine weave fabrics enabling lower cost heavier weight reinforcement to be used as the first ply into the mould. This makes the material particularly suitable for the production of wind-turbine aerofoil sections and any other large components with simple curvature such as marine craft, ray-domes, architectural mouldings and bridges. A heavy weight fabric or fibrous material (at least 600 gsm fibre layer) is not suitable for more complex parts, like automotive door wings, which require the material to be cut and draped around tightly detailed features,

BRIEF DESCRIPTION OF THE DRAWINGS

Embodiments of the invention will now be described, by way of example only, with reference to the accompanying Figures, in which.

DETAILED DESCRIPTION

In accordance with the preferred embodiments of the present invention, the basic manufacturing process for the fibre-reinforced composite moulding includes the steps of:
preparing a mould and applying a release agent;
placing in the mould a surfacing layer comprising a surfacing resin film in the form of at least one solid sheet, with preferable overlaps between adjacent segments of the surfacing layer, the surfacing layer optionally being provided in combination with a dry fabric reinforcement layer adjacent to the surfacing layer which is pre-tacked to the surfacing layer;

placing in the mould, over the surfacing layer, a structural layer comprising structural dry fabric reinforcements, with preferable overlaps between adjacent segments of the structural layer;

optionally placing over the structural layer additional structural dry fabric reinforcements and core material;

placing and connecting a resin feed infusion system;

covering the mould with a peel ply, a release film, an optional infusion mesh and a vacuum bag;

debulking the system under full vacuum;

conditioning the system at the resin infusion temperature to remove remaining entrapped air and to soften the surfacing resin film;

creating a pressure differential across the system and using the pressure differential to feed a resinous compound into the system to coat the fibrous reinforcement capable of being infused;

ceasing the feeding of the resinous compound into the system;

maintaining some pressure differential; and allowing the resinous compound and the surfacing resin film to set and cure.

A more detailed explanation of the process steps in accordance with one particular embodiment is described with reference to FIGS. 1 to 6 of the drawings.

Figure 1:
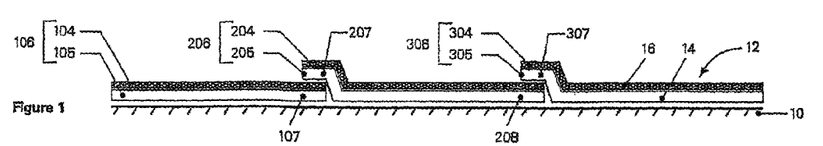
FIG. 1 is a cross-sectional view, in the width direction of the mould, of an arrangement of a plurality of overlapping surfacing films formed in a first step of an embodiment of the method of the present invention.
Figure 2:
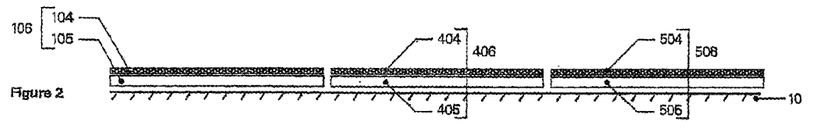
FIG. 2 is a cross-sectional view, in the length direction of the mould, of the surfacing films of FIG. 1.

FIGS. 1 and 2 show the preferred layout for the surfacing layers depending on their location in a mould. Referring to FIGS. 1 and 2, after preparing a mould and applying a release agent (not shown) to the mould surface 10, a surfacing layer 12 is applied to the mould surface 10. The surfacing layer 12 comprises a surfacing resin layer 14 in the form of at least one solid sheet that is carried on a layer 16 of scrim material to assist resin retention of the mould surface 10. Typically the scrim layer 16 is a polyester material, such as a polyester veil 16.

In the illustrated embodiment, the surfacing layer 12 comprises a plurality of surfacing layer segments 106, 206, 306 assembled together to form a continuous surfacing layer 12 in the form of plural solid sheets.

When assembling the surfacing layer 12 onto the mould surface 10, a first segment 106 is overlapped by a second segment 206 in the width direction of the mould, the overlap forming a lower covered edge portion 107 of the first segment 106 and an upper covering edge portion 207 of the second segment 206. In turn, the second segment 206 is overlapped by a third segment 306 in the width direction of the mould, the overlap forming a lower covered edge portion 208 of the second segment 206 and an upper covering edge portion 307 of the third segment 306. Accordingly, the opposing edge portions 207, 208, longitudinally directed along the mould, of the second segment 206 have an overlapping, over or under respectively, relationship with an edge portion 107, 307 of the respective adjacent segment 106, 306.

Although not illustrated, if there are further segments in the width direction, this overlapping configuration is repeated across the width of the mould for successive segments.

In the length direction of the mould, it is possible to have different configurations of the surfacing layer. In many embodiments, a continuous length of surfacing layer can be disposed along the length of the mould, and where possible this may be preferable to reduce layup time, for example. In other alternative embodiments, the surfacing layers can overlap or abut in the length direction of the mould.

However in this particular embodiment, in the length direction of the mould, there is an abutting relationship. Referring back to the drawings, adjacent to the first segment 106 is a fourth segment 406. The fourth segment 406 abuts and is positioned flush with the edge of the first segment 106. Correspondingly, a fifth segment 506 abuts the fourth segment 406 and is positioned flush with the edge of the fourth segment 406.

Each surfacing layer segment 106, 206, 306, 406, 506 comprises a surfacing resin layer segment 105, 205, 305, 405, 505 that is carried on a scrim material segment 104, 204, 304, 404, 504.

Again, although not illustrated, if there are further segments in the length direction, this abutting configuration is repeated across the length of the mould for successive segments.

Additional segments are disposed in the mould, in an overlapping relationship in one direction, and in an abutting relationship in another direction, so as to cover the entire mould surface. The plural surfacing layer segments 106, 206, 306, 406, etc. therefore form a segmented continuous surfacing layer 12 in the form of a plurality of solid sheets.

In an alternative embodiment, there may be such an overlapping relationship for the surfacing films in two mutually oriented directions, for example in the length direction of the mould as well as the width direction of the mould which is orthogonal thereto. This can provide that all of the surfacing layer edges have an overlapping relationship, except at the extremities of the mould.

Figure 3:
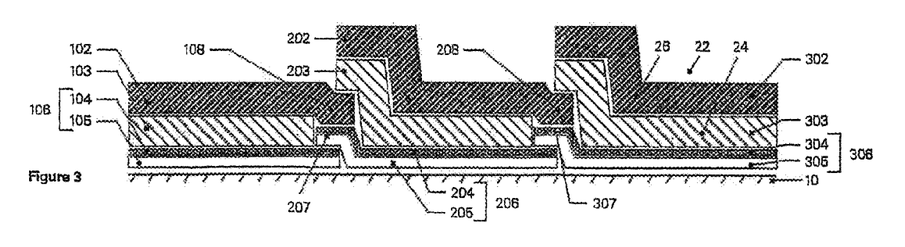
FIG. 3 is a cross-sectional view, in the width direction of the mould, of the surfacing films of FIG. 1 subsequently covered by a first two layers of dry fabric reinforcements in a second step of the embodiment of the method of the present invention.
Figure 4:
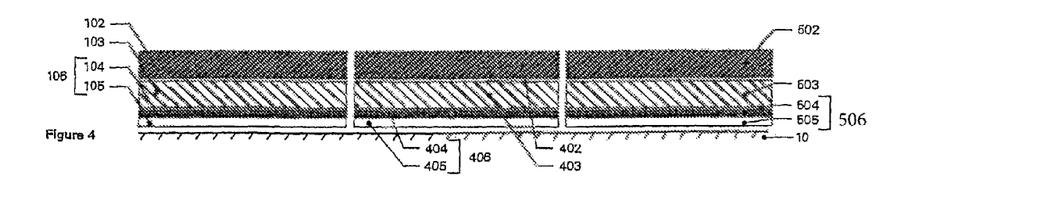
FIG. 4 is a cross-sectional view, in the length direction of the mould, of the assembly of FIG. 3.

Referring to FIGS. 3 and 4, after the surfacing layer 12 has been formed, a structural layer 22 comprising at least one layer 24, 26 of dry fibrous reinforcing material is disposed on the surfacing layer 12 to provide, on the portion of the mould surface 10, an assembly, in the form of a laminar stack, of the surfacing layer 12 and structural layer 22.

The dry fibrous reinforcing material may be selected from one or more of glass fibre, aramid fibre, carbon fibre, flax, or jute, or mixtures thereof.

The at least one layer 24, 26 of fibrous reinforcing material is preferably segmented and subsequently positioned above the surfacing layer 12 in an overlapping segmented configuration, similar to that for the surfacing layer 12, to provide a venting structure and allow entrapped air to pass out during subsequent resin infusion processing.

In the overlapping segmented configuration, a respective segment stack of dry reinforcement layers 102, 103; 202, 203; 302, 303 is located over the respective surfacing layer segment 106; 206; 306.

Initially, a segment stack of dry reinforcement layers 102, 103 is disposed over the first surfacing layer segment 106.

The lowermost dry reinforcement layer 103 of the first stack segment is shaped and dimensioned so as to cover that portion of the upper surface of the first surfacing layer segment 106 which is exposed, and so abuts the edge portion 207 of the second segment 206. The next dry reinforcement layer 102 is placed over the first dry reinforcement layer 103 and is shaped and dimensioned so as to cover the lowermost dry reinforcement layer 103 and, by an edge portion 108 of the next dry reinforcement layer 102, the edge portion 207 of the second segment 206.

Subsequently, a second segment stack of dry reinforcement layers 202, 203 is disposed over the second surfacing layer segment 206.

The lowermost dry reinforcement layer 203 of the second stack segment is shaped and dimensioned so as to cover that portion of the upper surface of the second surfacing layer segment 206 which is exposed, and so abuts the edge portion 307 of the third segment 306, and also so as to cover the edge portion 108 of the dry reinforcement layer 102. The next dry reinforcement layer 202 is placed over the lowermost dry reinforcement layer 203 and is shaped and dimensioned so as to cover the lowermost dry reinforcement layer 203 and, by an edge portion 208 of the next dry reinforcement layer 202, the edge portion 307 of the third segment 306.

Subsequently, a third segment stack of dry reinforcement layers 302, 303 is disposed over the third surfacing layer segment 306.

The lowermost dry reinforcement layer 303 of the third stack segment is shaped and dimensioned so as to cover that portion of the upper surface of the third surfacing layer segment 306 which is exposed, and so as to cover the edge portion 208 of the dry reinforcement layer 202. The next dry reinforcement layer 302 is placed over the lowermost dry reinforcement layer 303 and is shaped and dimensioned so as to cover the lowermost dry reinforcement layer 303.

If there are further segments across the width of the mould, subsequent segment stacks of dry reinforcement layers are correspondingly applied in an overlapping configuration.

In the length direction of the mould, as for the surfacing layer it is possible to have different configurations of the dry reinforcement layers. In many embodiments, a continuous length of dry reinforcement layer can be disposed along the length of the mould over the surfacing layer, and where possible this may be preferable to reduce layup time, for example. In other alternative embodiments, the dry reinforcement layers can overlap or abut in the length direction of the mould.

However in this particular embodiment, in the length direction of the mould, there is an abutting relationship. Referring back to the drawings, the fourth segment 406 is correspondingly covered by dry reinforcement layers 402, 403 that abut and are positioned flush with the edges of the dry reinforcement layers 102, 103. Correspondingly, the fifth segment 506 is covered by dry reinforcement layers 502, 503 that abut and are positioned flush with the edges of the dry reinforcement layers 402, 403 over the fourth segment 406.

Again, although not illustrated, if there are further segments in the length direction, this abutting configuration of the dry reinforcement layers is repeated across the length of the mould for successive segments.

The structural dry reinforcement layers are disposed in the mould over the respective surfacing segments, in an overlapping relationship in one direction, and in an abutting relationship in another direction, so as to cover the entire mould surface. This forms a segmented continuous structural layer 22.

In an alternative embodiment, there may be such an overlapping relationship for the structural dry reinforcement layers in two mutually oriented directions, for example in the length direction of the mould as well as the width direction of the mould which is orthogonal thereto. This can provide that all of the structural dry reinforcement layer edges have an overlapping relationship, except at the extremities of the mould. The selection of the particular overlapping relationship can depend on the structure and composition of the dry fabric reinforcement layers, and the particular nature and end application of the article being manufactured.

The provision of such an overlapping relationship for the structural dry reinforcement layers in two mutually oriented directions may be provided with either of the two overlapping configurations for the surfacing layer disclosed above, i.e. with the surfacing layer overlapping in only one direction or in two mutually oriented directions.

Figure 7:
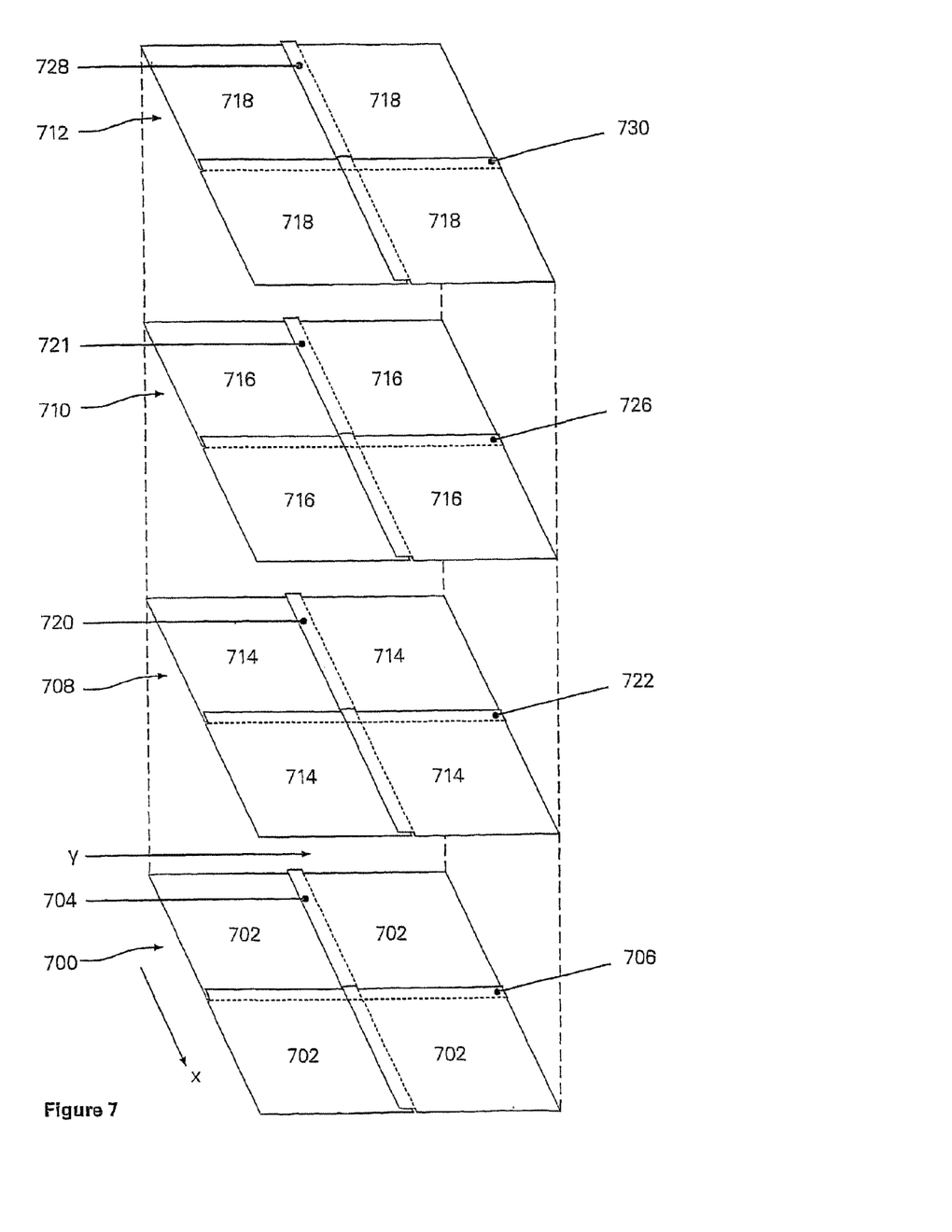
FIG. 7 is an exploded plan view, partly in phantom, of an arrangement of a plurality of overlapping surfacing films and layers of overlapping dry fabric reinforcements formed, the overlapping in each case being in the length direction of the mould and in the width direction of the mould, in accordance with a further embodiment of the method of the present invention.

FIG. 7 is an exploded plan view, partly in phantom, of an arrangement of a plurality of overlapping surfacing films and layers of overlapping dry fabric reinforcements formed, the overlapping in each case being in the length direction of the mould (x) and in the width direction of the mould (y), in accordance with a further embodiment of the method of the present invention. The surfacing film 700 includes a plurality of segments 702 that overlap on adjacent edges 704, 706, oriented in two orthogonal directions (x and y). Each of three stacked layers 708, 710, 712 of dry fabric reinforcement includes a respective plurality of segments 714, 716, 718 that also overlap on adjacent edges 720, 722; 724, 726; 728, 730, oriented in two orthogonal directions. As discussed herein, in such a stack of overlapped segments the dry fabric reinforcement layers are typically biaxial and/or triaxial dry fabric reinforcement layers.

It will be apparent to the skilled person that the illustrated embodiment incorporates two structural dry reinforcement layers but fewer or more layers, and core materials such as wood and foam, may be employed if desired.

In an alternative embodiment, a first layer of reinforcement fibre may be initially adhered, by tacking, to the surfacing layer segments that are laid down onto the mould surface. Accordingly the first layers disposed in the mould are integral resin surfacing and fibre reinforcement layers. This embodiment can reduce the total lay-up time required to assemble all of the layers to form the laminate in the mould.

Figure 5:
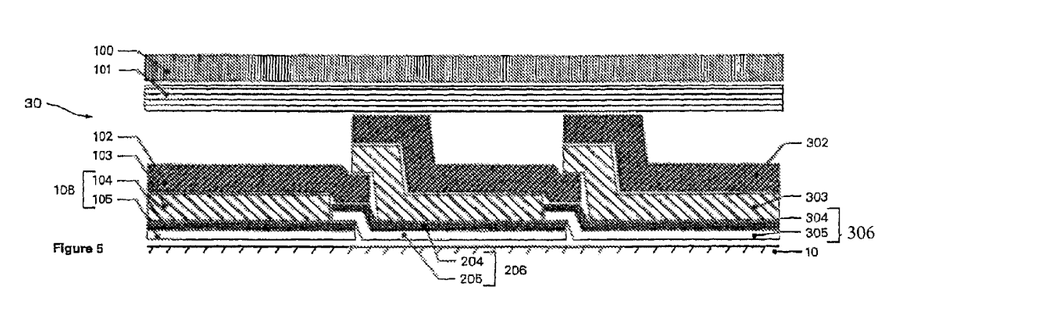
FIG. 5 is a cross-sectional view, in the width direction of the mould, of the assembly of FIG. 3 subsequently covered by additional dry fabric reinforcements and a core in a subsequent step of the embodiment of the method of the present invention.
Figure 6:
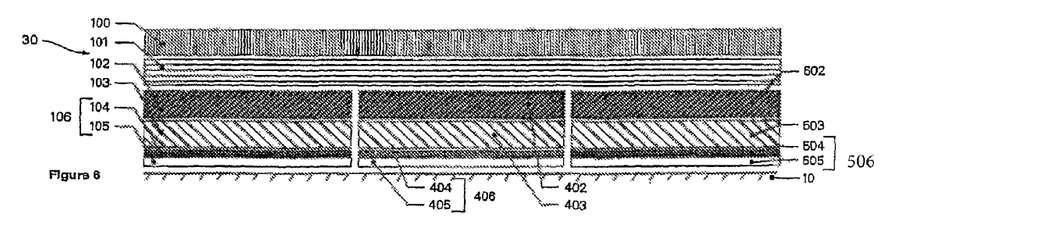
FIG. 6 is a cross-sectional view, in the length direction of the mould, of the assembly of FIG. 5.

Referring to FIGS. 5 and 6, at least one additional layer may then be disposed over the structural layer 22. The at least one additional layer may comprise, for example, a foam core 101 and/or one or more additional structural dry reinforcement layers 100. This completes the laminate stack 30 which is now ready for resin infusion, as shown in FIG. 6.

The embodiment illustrated in FIGS. 1 to 6 preferably incorporates a triaxial dry fabric reinforcement structure, in which the fibres of the structural dry reinforcement layers are oriented in three respective axial directions. However in alternative embodiments, the configuration of the dry fabrics structural reinforcement layers may be different. For example, the structural dry fabrics could either be unidirectional (UD), biaxial or triaxial in orientation. The overlaps of the dry fabrics would generally exist in the both the width and length directions for biaxial and triaxial orientations. In general, unidirectional (UD) fabrics overlap in the width direction, whereas in the length direction such overlap is not necessary and would generally only occur if, during lay-up of the fabric into the mould, there is a short fabric roll and the fabric stops in the middle of the mould.

The resin infusion is then carried out in a manner known to those skilled in the art. In particular, the assembly of surface, structural and additional layers on the mould is covered with, in turn, a peel ply, a release film and an optional infusion mesh to increase the impregnation speed in selected parts of the laminate. Then the entire mould assembly is disposed within a vacuum bag. A resin feed infusion system is connected to the bag, the bag having an upstream port connected to a source of resinous compound and a downstream port connected to a source of vacuum. The vacuum is applied to the vacuum bag with the upstream port closed thereby to debulk the system under full vacuum. If necessary, any leaks are identified and repaired if present. The vacuum is maintained at a desired level in order to condition the system at the resin infusion temperature to remove remaining entrapped air and soften the surfacing resin film. Then the upstream port is opened, thereby creating a pressure differential across the system. The pressure differential acts to feed a liquid resinous compound from the source of resinous compound into the system to coat the fibrous reinforcement. In this way, the resinous compound is infused completely into the dry fibrous reinforcement layers. Sufficient structural infusion resin is fed to the system to fully impregnate the fibres. Finally, the feeding of the resinous compound into the system is terminated, and full vacuum is applied to the system. The infused structural resin then increases in viscosity and begins to cure after a time period governed by the resin reactivity and the amount of heat applied to the laminate. Alternatively the vacuum may be reduced if the resin has a long gel time to prevent the resin being drained out of the laminate. Additional heat can be applied during, or after, resin injection to speed up the curing process of the structural resin and activate the cure of the surface resin.

After complete curing of the structural resin and the surface resin, the vacuum is removed, the vacuum bag is opened, the peel ply, release film and infusion mesh are removed, and the laminate is released from the mould. The surface of the laminate, substantially ready for painting, comprises the cured surface resin and the scrim layer.

The surfacing resin 14 is selected such that it is air permeable to provide an additional pathway for the removal of air during the evacuation process. The thickness of the surfacing layer 12 is preferably selected to be 100-400 microns, more preferably 100-300 microns. Within this thickness range it has been found that the surfacing resin 14 can be made partially air permeable. If the surfacing resin layer 14 is too thin then a sufficient thickness barrier is not obtained between the fibre reinforcement and the subsequently applied paint causing a pattern of the underlying fibres, known as a print pattern, potentially to appear on the resin surface. If the layer is too thin, this can lead to dry fibre close to the surface that can cause problems when sanding the surface prior to painting. The resulting dry glass fibre particles can get trapped on the abrading tool (e.g. a disc) and are very abrasive, which can lead to scratch marks, in turn requiring repeated abrasive tool changes and additional filling and fairing repair steps prior to painting.

The air between the mould surface 10 and the surfacing layer 12 can pass through the surfacing layer 12 and into the more highly air permeable dry fibre layers 102 and 103, to then be drawn away into the vacuum source. It is not essential that an air breathing scrim 16 is provided in the surface layer 12 so as to be located substantially at the mould surface 10. However, the use of a scrim 16 provides the advantage that the tack of the surface resin 14 is more consistent and depends only on the resin formulation of the surface resin 14 which is formulated to give the desired and consistent tack level. The fine polyester scrim 16 within the surfacing layer 12 serves two purposes. First, it helps prevent fibres of the structural fibre reinforcement from entering the surface resin layer 14. Moreover, the fine weave layer helps prevent the resin 14 in the surfacing layer 12 reticulating off the mould surface 10 giving a better quality of finish to the surface of the resultant laminate. The polyester scrim 16 is itself easy to sand and does not result in abrasive particles damaging the surface.

The dry reinforcement layers provide one or more highly permeable air venting paths to remove air when a vacuum is applied to the laminate stack. As the pieces of material are overlapped the surface layer is now in connection with the highly air permeable dry fibre layer allowing a more direct and effective air path to the vacuum source. The overlapping zone allows more effective connection of the dry reinforcement to give a highly permeable venting structure. The continuous surface resin prevents defects occurring at the point of overlap of the material. The zone is an important feature of the present invention, and is necessary for heavier weight fabrics above 600 gsm. Without the overlapping zone the air permeability across the overlapped fabric is reduced leading to defects in larger components.

As well as providing a thickness buffer to avoid fibre print, the surface resin layer 14 provides a protective barrier for reducing moisture ingress into the laminate. Fibre strands, in particular of glass fibre, close to the surface can accelerate moisture ingress by a wicking mechanism.

The surface resin 14 may be toughened and the modulus reduced by the incorporation of rubber, for example, into the resin. This is a particular advantage as this helps to prevent cracks from any mismatch in thermal expansion between the subsequently-applied paint and the laminate. The tailored surface resin helps improve paint chipping that occurs in impact situations.

The overlapping configuration of the dry reinforcement layers 102, 103, 202, 203, 302, 303 provides one or more highly permeable air venting paths to remove air when a vacuum is applied to the laminate stack. As the pieces of material are overlapped, the edge portion 207 of the surfacing layer 206 is directly in connection with the highly air permeable dry fibre layer 102 allowing a more direct and effective air path to the vacuum source in subsequent processing, as discussed below.

The overlapping zone allows more effective connection between the dry reinforcement layers 102, 103, 202, 203, 302, 303 to give a highly permeable venting structure. The continuous surfacing segment layers 106, 206, 306 including the surfacing resin layer segments 105, 205, 305 prevent defects occurring at the point of overlap of the material.

Due to the venting structure the trapped air is removed by the application of vacuum to the material and the cured surface layer is virtually free of voids. This resultant surface structure has been found to reduce the rate of coating erosion.

The structural infusion resin and surface resin have a different viscosity. The viscosity of the structural resin is usually selected to be lower than that of the surface resin at infusion temperature, so that the structural resin can readily be infused without the vacuum disrupting the surface resin layer. The viscosity of the surface resin is higher than the structural resin to ensure that the surface resin stays closer to the mould surface to maintain the thickness of the surface layer in the final component.

Resin viscosity and the difference in the viscosity between the surfacing film resin and structural resin is an important feature of the present invention.

Materials with different viscosity profiles can be made to work by adjusting the cure cycle provided a differential viscosity exists between the surfacing resin layer and structural resin.

The surfacing film is required to have a relatively high minimum viscosity to prevent premature wet-out of the dry fibre reinforcement prior to termination of the resin infusion step. The viscosity must also be sufficiently high to stop the dry fibre reinforcement moving to the surface. The viscosity must also be sufficiently high to ensure that the surfacing layer remains as a coherent resin layer during the composite moulding material production process. However, the viscosity must not be too high otherwise the wettability of the mould surface by the surfacing resin may be inadequate. The surfacing resin should also have a sufficient degree of flow to enable the solid resin layer to fill any minor discontinuities or voids at any overlaps between the separate surfacing sheet segments when the surfacing layers are subjected to vacuum processing prior to curing. The surfacing resin should also have a good cold-flow resistance to enable the solid resin layer in sheet form to be stored on a roll, and have a good shelf-life and product stability. The surfacing resin should also have a good abrasion resistance (typically measured in a Taber abrasion test) to permit some degree of surface abrasion, for example sanding of the primer surface resin layer prior to painting, whilst maintaining surface toughness and integrity.

Typically, the surfacing resin has a viscosity of from $0.1 \times 10^5$ to $5 \times 10^5$ Pa·s measured at 20° C.

The structural resin in contrast has a lower viscosity to enable it readily to be infused under vacuum into the dry fibrous reinforcement layers.

Typically, the structural resin has a viscosity of from 0.1 to 2 Pa·s measured at 20° C., preferably from 0.1 to 0.6 Pa·s.

In this specification, the resin viscosity of the structural resin is measured using a TA Instruments AR2000 rheometer with a 40 mm diameter aluminium 2° cone and a Peltier cooling system. The experiment was carried out under the following conditions: a course shear rate sweep experiment at 20° C. from 0.01 $s^{-1}$ to 500 $s^{-1}$ with a gap of 57 µm. The viscosity of the material was taken as an average during the linear Newtonian region between 1-100 $s^{-1}$.

In this specification the resin viscosity of the surfacing resin is measured using a TA Instruments AR2000 rheometer with a 20 mm diameter steel plate and a Peltier cooling system. The experiment was carried out under the following conditions: oscillation experiment from 40° C. down to 0° C. at 2° C./min with a controlled displacement of $1 \times 10^{-4}$ rads at a frequency of 1 Hz and a gap of 1000 µm.

Moreover, the structural resin has a viscosity to enable it readily to be infused under vacuum conditions that in contrast do not cause any significant spreading or flow of the surfacing resin. The surfacing resin should have a viscosity that is higher than the structural resin so that the surfacing resin cannot wet the structural reinforcement before the surfacing resin (i.e. the surfacing resin must be thick enough to achieve this technical effect), but the viscosity should be low enough so that the surfacing resin can exhibit a minor degree of spreading and flow on the mould surface and thereby can assist with air removal under the vacuum processing (i.e. the surfacing resin must be thin enough to achieve this technical effect).

Preferably, the ratio of the viscosity, measured at 20° C. ambient temperature, of the surfacing resin and of the structural resin is at least 100/1, more preferably at least 1000/1, yet more preferably at least 10,000/1.

The structural resin has a slow reactivity at the infusion temperature to allow full impregnation of the dry fibrous reinforcement layers. The surface resin begins to cure after the infusion resin initiates curing. This is achieved by exothermic heat generation from the curing infusion resin heating the surface resin to activate the curing mechanism and/or by heating the tool on which the surface resin is disposed. The surface and structural resin continue to cure together at least partially simultaneously which promotes a high level of adhesion between the different resin materials.

The surface resin is preferably selected from the group consisting of thermoset resins such as epoxy, cyanate ester and phenolic resins. Suitable epoxy resins include diglycidyl ethers of bisphenol A, diglycidyl ethers of bisphenol F, epoxy novolac resins and N-glycidyl ethers, glycidyl esters, aliphatic and cycloaliphatic glycidyl ethers, glycidyl ethers of aminophenols, glycidyl ethers of any substituted phenols and blends thereof. Also included are modified blends of the aforementioned thermosetting polymers. These polymers are typically modified by rubber or thermoplastic addition. Any suitable catalyst may be used. The catalyst will be selected to correspond to the resin used. One suitable catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of toluenedlisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts.

The surface material can be provided with a toughening agent. Suitable toughening agents can be selected from liquid rubber (such as acrylate rubbers, or carboxyl-terminated acrylonitrile rubber), solid rubber (such as solid nitrite rubber, or core-shell rubbers), thermoplastics (such as poly (EtherSulphone), poly (Imide)), block copolymers (such as styrene-butadiene-methacrylate triblocks), or blends thereof.

The structural resin is preferably selected from the group consisting of thermoset resins such as epoxy, cyanate ester and phenolic systems. Suitable epoxy resins include diglycidyl ethers of bisphenol A, diglycidyl ether of bisphenol F, glycidyl ethers of any substituted phenols, higher molecular weight of any of those molecules, epoxy novolac resins and glycidyl esters, aliphatic and cycloaliphatic glycidyl ethers, glycidyl of aminophenols, glycidyl amine and blends thereof.

Reactive or non reactive diluents can also be used. Reactive diluents may include monofunctional or multifunctional reactive diluents such as C12-C14 glycidyl ether or butane diol diglycidyl ether. Non reactive diluents may include nonyl phenol, furfuryl alcohol, dibutyl phthalatem, polymethyl acetal.

Also included are modified blends of the aforementioned thermosetting polymers, with such modifiers as liquid rubber (such as acrylate rubbers, or carboxyl-terminated acrylonitrile rubber), solid rubber (such as solid nitrite rubber, or core-shell rubbers), thermoplastics (such as poly (EtherSulphone), poly (Imide)), block copolymers (such as styrene-butadiene-methacrylate triblocks), or blends thereof.

The curing agent or catalyst will be selected to correspond to the resin used. Suitable curing agents are aliphatic amines, cycloaliphatic amines, aromatic amines, polyamides, amidoamines, polysulfides, anhydride and any suitable adduct of. Suitable catalyst may include salicylic acid, aliphatic tertiary amines, and aminoethylpiperazine.

One suitable latent catalyst for use with an epoxy resin is a dicyandiamide curing agent. The catalyst may be accelerated. Where a dicyandiamide catalyst is used, a substituted urea may be used as an accelerator. Suitable accelerators include Diuron, Monuron, Fenuron, Chlortoluron, bis-urea of toluenedlisocyanate and other substituted homologues. The epoxy curing agent may be selected from Dapsone (DDS), Diamino-diphenyl methane (DDM), BF3-amine complex, substituted imidazoles, accelerated anhydrides, metaphenylene diamine, diaminodiphenylether, aromatic polyetheramines, aliphatic amine adducts, aliphatic amine salts, aromatic amine adducts and aromatic amine salts. Amine and anhydride curing agents are being preferred to give low viscosity and room temperature cure.

The preferred embodiments of the present invention provide the use, for forming a composite laminate having a high quality smooth defect-free surface that can be painted, of the combination of (a) a low temperature activated, typically from 50° C. and above, more typically from 50° C. to 90° C., relatively high viscosity thermoset curing resin for forming a surface of the composite laminate with (b) a relatively low viscosity thermoset curing resin suitable for resin infusion processing for forming, after infusion into fibre-reinforcement located adjacent to the surfacing resin, a fibre-reinforced structure of the composite laminate.

The surface resin film is easy to sand, if necessary, to prepare the laminate surface for subsequent painting.

In accordance with the preferred embodiments of the present invention, the surface resin is formulated to provide the desired correct characteristics. In particular, the surface resin has a viscosity so that it can be applied into a mould at about ambient temperature and exhibit the desired levels of tack to the mould and drape. Heat may be supplied to the resin to initiate or accelerate curing either during or after completion of the resin infusion stage.

In higher production rate vacuum infusion production, the tooling is heated during or after resin injection to speed up the cure rate. This offers the opportunity to mix and co-cure these different materials. This is typically a temperature of from 50-90° C. to enable the use of lower cost tooling. The target format is a low temperature (50° C.) activated catalytic cure.

The surfacing layer preferably contains surfacing resin and a polyester veil. During manufacture of the material, the polyester veil is first applied to the top of the surface resin. Some pressure is then applied to push the polyester veil into the top of the surface resin. Preferably, the polyester veil is located at a position within the upper portion of the surfacing resin layer, i.e. the polyester veil is covered on both sides by a respective portion of the surfacing resin layer, with a larger portion, i.e. a majority, on one side that is to be located directly adjacent to the mould surface. If a first fibre layer is also integrated into the surfacing layer, and in particular into the surface of the surfacing layer that is to be located remote from the mould surface, also the fibre layer is pressed into the surface resin to ensure that the surface material is maintained integral with, and stays fixed to, the fibre layer.

In the present invention it is preferred that the thickness of the surface film resin is between 100 and 400 microns, more preferably from 100 to 300 microns. Within this thickness range it has been found the resin can be made partially air permeable. Any air between the mould surface and the surface layer can pass through the surface layer and into the more highly air permeable dry fibre layers, to then be drawn away into the vacuum source.

The surfacing layer is structured and formulated so that the opposed surfaces exhibit differential tack. There is relatively high tack on one surface, the surface that is intended in use to contact and adhere to the mould surface, and relatively low tack on the opposite surface, the surface that is intended in use be manually handled and so is easier to handle. This tack differential can be achieved by providing the scrim material within the solid resin sheet, but offset relatively towards the lower tack surface. This means the tack of the material is more consistent and dependent only on the resin formulation of the surface resin which allows it to be formulated to give the desired and consistent tack level. Furthermore, the high tack level can ensure that a high degree of wetting of the mould surface can be achieved, which renders the surfacing layer to be uniformly adhered to the mould surface over the entire surface area of the surfacing film. This in turn prevents reticulation of the surfacing layer from the mould surface following resin curing. In addition, the surfacing material is tolerant to handling pressure, or the pressure generated when the product is wound onto a roll. As a result the surfacing material used in the method of the present invention has extended room temperature storage prior to use.

The fine polyester scrim within the surfacing resin layer serves two purposes. It helps prevent fibres from the reinforcement entering the surface resin layer. The fine weave layer also helps prevent the resin in the surface resin film layer reticulating off the tool surface giving a better quality of finish. The polyester scrim itself is easy to sand and does not result in abrasive particles damaging the surface. As well as providing a thickness buffer to avoid fibre print the surface resin layer provides a protective barrier for reducing moisture ingress into the laminate. Glass fibre strands close to the surface can accelerate moisture ingress by a wicking mechanism. The surface resin can be toughened and the modulus reduced which is a particular advantage as this helps to prevent cracks from the mismatch in thermal expansion between the paint and the laminate. The tailored surface resin helps improve paint chipping that occurs in impact situations.

For composite structures requiring a painted finish, the preferred embodiments of the present invention can reduce the time taken and cost to prepare a Vacuum Assisted Resin Transfer Moulding (VARTM) fibre reinforced composite component for painting, and moreover the final durability of the painted component can be improved. When using VARTM methods to produce a fibre reinforced composite component, the preferred embodiments of the present invention, in order to produce a finish on composite part that would be easy to prepare for painting, can employ a temperature activated thermoset surface layer which can eliminate the need to apply, and wait for, an in mould gelcoat to tack off during the manufacturing process, The preferred embodiments of the present invention can provide a toughened flexible interface between the paint and the composite part to improve the durability of the final paint finish.

The manufacturing process of the preferred embodiments of the present invention combines hot-melt and infusion technologies to create a defect-free surface laminate ready for painting operations. A surface resin layer with a structural fibre reinforcement layer (hot-melt) is placed against the mould and a composite layout compatible with infusion technology is placed over it to provide a venting structure and allow entrapped air to pass out during processing. The rheological behaviours of the hot-melt and infusion resins are different.

The preferred embodiments of the present invention can also provide a sufficient tack level to retain the first dry reinforcement layer on the released tool surface. It is particularly suitable for large parts such as wind turbines, bridges, and boat hulls.

This method of the preferred embodiments of the present invention is particularly suitable for the production of wind-turbine aerofoil sections and any other large components with simpler curvature such as marine craft, ray-domes, architectural mouldings and bridges using infusion technology.

The preferred embodiments of the present invention can provide the manufacture of a composite structure with a defect-free surface, which is ready for painting. By avoiding the need for a gelcoat, correspondingly there is no need for any gelcoat handling, which improves the health and safety aspects of the manufacturing process. In known processes that employ a gelcoat layer, the gelcoat layer provides the advantage that it provides tack to hold in a correct position on the mould surface the first layer of fibre reinforcement The preferred embodiments of the present invention provide the tack in the absence of such a gelcoat layer; because the surfacing layer provides the required tack for the first layer of reinforcement so that it can be can be correctly positioned into the mould.

The preferred embodiments of the present invention can reduce the total production time and the amount of manual labour required for the manufacturing cycle.

Also, in this manufacturing method of the preferred embodiments of the present invention a good surface finish is obtained without the need for additional tissues and high cost fine weave fabrics as compared to some known processes. This can enable lower cost heavier weight reinforcement to be used as the first ply into the mould. The resulting surface free of defects is the primary result which can yield a reduction in the overall time and labour required for the production of a painted composite surface.

The surface resin layer can also provide a protective barrier for reducing moisture ingress into the composite laminate structure. The surface resin can also act as a buffer, and its increased toughness helps to reduce inadvertent paint chipping that can occur in impact situations when the composite product is in operation.

The method of the present invention is at least partially predicated on the realisation by the present inventors that by combining two resin providing technologies then significant technical improvements to both the efficiency and utility of the composite laminate manufacturing process and the properties of the resultant composite laminate can be achieved. To those of ordinary skill in the art of manufacturing composite laminates, the present inventors believe that the conventional perception of the known vacuum infusion process is that low cost resin materials can be employed that cure at ambient temperature. In contrast, the conventional perception of the use of pre-pregs is that a more expensive higher quality material is required and produced, that necessitates an elevated temperature cure and better stock management due to the limited shelf life of the resin in the pre-prep at ambient temperature. The initial investment for pre-preg production is higher due to the need for more expensive high temperature tooling, and storage chillers to maintain the shelf life of the pre-preg. In the composite laminate manufacturing art, manufacturers tend to select and stay with one particular process route.

In known resin infusion processes, unidirectional (UD) fibre reinforcement materials that are subject to the resin infusion may be stitched or bonded into a fabric format to give a handleable fibre to put into the mould. However, this expedient adds manufacturing cost and lowers the properties of the resultant composite laminate. In embodiments of the present invention however, the use of a unidirectional (UD) prepreg is cost effective, because the resin in the pre-preg maintains fibre alignment, and so the method can use the lowest cost fibre pre-cursors yet give high level properties in the resultant composite laminate. For example, in order to manufacture a turbine blade shell, in accordance with one embodiment of the present invention, pre-consolidated pre-preg UD stacks are interleaved with dry off-axis fabric reinforcements. The dry reinforcements are then infused with liquid resin. The combination of heating the mould and the exothermic reaction of the liquid resin is sufficient to raise the heat of the laminate to activate the cure of the resin in the pre-preg UD material. This UD material then is thick and reactive enough to generate further heat through an exothermic cure to rapidly cure without the need for high heat input. This provides the technical advantage that lower cost, lower temperature resistant moulds and tools can be utilised to cure the composite laminate parts.

The present invention is illustrated further in the following non-limiting Example.

EXAMPLE 1

A mould was provided having a mould surface as shown in FIG. 1. A standard release agent was applied to the mould surface.

In this Example, the surfacing layer comprised an epoxy resin. The resin material of the surfacing layer had a viscosity of from $0.1 \times 10^5$ to $5 \times 10^5$ Pa·s measured at 20° C., in particular a value of $1.02 \times 10^5$ Pa·s measured at 20° C.

This layer was supplied at a weight of 200 g per square metre. However the alternative weight of 250 g per square metre may be employed. In either case the surfacing layer thickness is from 100 to 400 microns:

As shown in FIG. 1, a first surfacing layer segment 106 (200 g material, 530×250 mm) was placed in the mould. A second surfacing layer segment 206 (200 g material, 530×250 mm) was then placed in the mould with a 35 mm overlap on the 530 mm edge of the previous first surfacing layer segment 106 in the width direction of the mould, as shown in FIG. 1. An adjacent surfacing layer segment 406 (200 g material, 530×250 nun) was placed flush with the end of the first surfacing layer in the length direction of the mould, as shown in FIG. 2. Further surfacing layer segments were applied using the repeated overlapping configuration as shown in FIG. 1 until the width of the mould was covered. Then further surfacing layer segments were applied using the repeated abutting flush configuration until the length of the mould was covered, as shown in FIG. 2.

The entire mould surface was therefore covered with a continuous surfacing layer, in segmented form.

The dry structural layer was then applied over the surfacing layer. One layer segment of dry fabric reinforcement 103, which had biaxially oriented fibres, was placed over the first surfacing layer segment 106, flush with the edge side of the mould and flush with the edge of the second overlapping edge of the surfacing layer segment 206. Then one layer segment of fabric reinforcement 102, which had uniaxially oriented (i.e. unidirectional (UD)) fibres, was placed over the previous layer segment of reinforcement 103, flush with the edge side of the mould and overlapping the overlap of surfacing layer segment 206. The segment edges were aligned with the edges of the surfacing layer segment 106, as shown in FIG. 3. Thereafter, another layer segment of dry fabric reinforcement 203 was placed with one edge aligned with the edge of the overlapping layer of surfacing layer segment 206 underneath and the other edge flushed with the next overlapping edge of surfacing layer segment 306. Another layer of dry fabric reinforcement was placed with both edges aligned with the edges of the surfacing layer segment 206 underneath, as shown in FIG. 3. These steps were repeated until the width of the mould was covered with the first layer of structural fibre reinforcement.

Other layer segments of the reinforcement fabric 102 and 103 were placed along the length of the mould with the edges flush, or aligned with, the surfacing layer segment 106. These steps were repeated until the length of the mould was covered, as shown in FIG. 4.

A resin infusion system was connected up and the mould was covered mould with one layer of peel ply, one layer of release film, one layer of infusion mesh and one layer of vacuum bag.

The entire mould assembly was placed under full vacuum for debulking, which was carried out for 10 minutes at ambient temperature.

Then the entire mould assembly was subjected to conditioning at a higher temperature to remove remaining entrapped air and soften the surfacing resin film. The elevated temperature was 50° C. for a conditioning period of 1 hour.

Thereafter, the resin infusion was carried out. A pressure differential across the length of the mould was established by control of the vacuum and the pressure differential was used to feed by infusion a resinous compound into the laminate structure on the mould surface to coat the fibrous reinforcement. The structural resin was an epoxy resin available in commerce from the applicant Gurit (UK) Limited under the trade name Prime 20 LV resin with the addition of Prime 20 slow hardener.

The structural resin had a viscosity of from 0.1 to 2 Pa·s measured at 20° C., in particular a value of 0.38 Pa·s measured at 20° C.

The infusion was carried out in an oven at an elevated temperature of 50° C. After complete coating of the structural layer dry fibres, the feeding of the resinous compound into the laminate was terminated. The pressure differential was maintained and the resinous compound allowed to set and cure. The curing period was 15 hours at a temperature of 90° C.

The laminate was finally removed from the mould after cooling

It was found that the resultant composite was free of surface defects on de-moulding.

The present invention is not limited to the foregoing example and illustrated embodiments. It will be apparent to those skilled in the art that various modifications to the present invention may be made without departing from the scope of the present invention as defined in the appended claims.

The invention claimed is:

1. A method of manufacturing a fibre-reinforced composite moulding, the method comprising the steps of:
   (a) disposing a surfacing layer on a portion of a mold surface, the surfacing layer comprising a first resin material and being in a form of at least one solid sheet, the first resin material of the surfacing layer being supported on a carrier of a sheet material, wherein the surfacing layer comprises a plurality of surfacing layer segments assembled together to form a continuous surfacing layer;
   (b) disposing at least one layer of dry fibrous reinforcing material on the surfacing layer to provide, on the portion of the mould surface, an assembly of the surfacing layer and a structural layer comprising the at least one layer of dry fibrous reinforcing material;
   (c) applying a vacuum to the assembly;
   (d) in a vacuum assisted resin transfer moulding step, a resin feed infusion system feeds a liquid resinous compound from a source of such resinous compound into the assembly, the liquid resinous compound comprising a second resin material, wherein the second resin material is infused, under the vacuum, into the at least one layer of dry fibrous reinforcing material; and
   (e) curing the first and second resin materials to form the fibre-reinforced composite moulding which comprises a surface portion formed from the surfacing layer laminated to a structural portion formed from the at least one layer of dry fibrous reinforcing material and the second resin material, wherein the first resin material of the surfacing layer has an applied weight thickness of from 100 to 400 grams per square meter (gsm).

2. A method according to claim 1, wherein each surfacing layer segment has at least one edge thereof that partially overlaps an adjacent 2 surfacing layer segment, wherein the overlap between adjacent surfacing layer segments has a width of from 10 to 75 mm.

3. A method according to claim 2, wherein the surfacing layer segments overlap on opposing edges.

4. A method according to claim 1, wherein the first resin material of the surfacing layer has a thickness of from 100 to 300 microns.

5. A method according to claim 1, wherein the sheet material of the surfacing layer has a weight of from 10 to 90 gsm.

6. A method according to claim 1, wherein the sheet material of the surfacing layer comprises a polymer or glass scrim material.

7. A method according to claim 1, wherein the sheet material of the surfacing layer is located at or proximal to a first face of the surfacing layer.

8. A method according to claim 7, wherein the first face of the surfacing layer is remote from the mould surface in disposing step (a) so that a majority of the first resin material is between the sheet material and the mould surface.

9. A method according to claim 1, wherein the first resin material and the second resin material cure at least partially simultaneously in the curing step (e).

10. A method according to claim 1, wherein the first resin material and the second resin material have different viscosities.

11. A method according to claim 10, wherein the first resin material has a higher viscosity than that of the second resin material at room temperature (20 degrees Centigrade).

12. A method according to claim 11, wherein a ratio of the viscosity, measured at 20° C. ambient temperature, of the first resin material and of the second resin material is at least 100/1.

13. A method according to claim 10, wherein in the curing step (e) the second resin material is adapted to initiate curing before the first resin material.

14. A method according to claim 10, wherein the curing step (e) is carried out at an elevated temperature above room temperature.

15. A method according to claim 14, wherein the curing step (e) is carried out at a temperature of from 40 to 90 degrees Centigrade.

16. A method according to claim 10, wherein in the curing step (e) the curing reaction of the second resin material is exothermic which generates heat which accelerates the curing of the first resin material.

17. A method according to claim 1, wherein the surfacing layer is previously affixed to a layer of the fibrous reinforcing material whereby the surfacing layer and at least one layer of fibrous reinforcing material are disposed on a portion of a mould surface in a common step.

18. A method according to claim 1, wherein the first resin material of the surfacing layer has a viscosity of from $0.1 \times 10^5$ to $5 \times 10^5$ Pa.s measured at 20° C.

19. A method according to claim 1, wherein the second resin material has a viscosity of from 0.1 to 2 Pa.s measured at 20° C.

20. A method of manufacturing a fibre-reinforced composite moulding, the method comprising the steps of:
   (a) disposing a surfacing layer on a portion of a mould surface, the surfacing layer comprising a first resin material and being in a form of at least one solid sheet, the first resin material of the surfacing layer being supported on a carrier of a sheet material, wherein the surfacing layer comprises a plurality of surfacing layer segments assembled together to form a continuous surfacing layer;
   (b) forming an assembly comprised of the surfacing layer and a structural layer comprised of at least one layer of dry fibrous reinforcing material;
   (c) applying a vacuum to the assembly;
   (d) in a vacuum assisted resin transfer moulding step, a resin feed infusion system feeds a liquid resinous compound from a source of such resinous compound into the assembly, the liquid resinous compound comprising a second resin material, wherein the second resin material is infused, under the vacuum, into the at least one layer of dry fibrous reinforcing material; and (e) curing the first and second resin materials to form the fibre-reinforced composite moulding which comprises a surface portion formed from the surfacing layer laminated to a structural portion formed from the at least one layer of dry fibrous reinforcing material and the second resin material, and wherein each surfacing layer segment has at least one edge thereof that partially overlaps an adjacent surfacing layer segment, wherein the overlap between adjacent surfacing layer segments has a width of from 10 to 75 mm.

21. A method of manufacturing a fibre-reinforced composite moulding, the method comprising the steps of:

(a) disposing a surfacing layer on a portion of a mould surface, the surfacing layer comprising a first resin material and being in a form of at least one solid sheet, the first resin material of the surfacing layer being supported on a carrier of a sheet material, wherein the surfacing layer comprises a plurality of surfacing layer segments assembled together to form a continuous surfacing layer;

(b) disposing at least one layer of dry fibrous reinforcing material on the surfacing layer to provide, on the portion of the mould surface, an assembly of the surfacing layer and a structural layer comprising the at least one layer of dry fibrous reinforcing material;

(c) applying a vacuum to the assembly;

(d) in a vacuum assisted resin transfer moulding step, a resin feed infusion system feeds a liquid resinous compound from a source of such resinous compound into the assembly, the liquid resinous compound comprising a second resin material, wherein the second resin material is infused, under the vacuum, into the at least one layer of dry fibrous reinforcing material; and (e) curing the first and second resin materials to form the fibre-reinforced composite moulding which comprises a surface portion formed from the surfacing layer laminated to a structural portion formed from the at least one layer of dry fibrous reinforcing material and the second resin material, and wherein the first resin material of the surfacing layer has a thickness of from 100 to 300 microns.

22. A method of manufacturing a fibre-reinforced composite moulding, the method comprising the steps of:

(a) disposing a surfacing layer on a portion of a mould surface, the surfacing layer comprising a first resin material and being in a form of at least one solid sheet, the first resin material of the surfacing layer being supported on a carrier of a sheet material, wherein the surfacing layer comprises a plurality of surfacing layer segments assembled together to form a continuous surfacing layer;

(b) disposing at least one layer of dry fibrous reinforcing material on the surfacing layer to provide, on the portion of the mould surface, an assembly of the surfacing layer and a structural layer comprising the at least one layer of dry fibrous reinforcing material;

(c) applying a vacuum to the assembly;

(d) in a vacuum assisted resin transfer moulding step, a resin feed infusion system feeds a liquid resinous compound from a source of such resinous compound into the assembly, the liquid resinous compound comprising a second resin material, wherein the second resin material is infused, under the vacuum, into the at least one layer of dry fibrous reinforcing material; and (e) curing the first and second resin materials to form the fibre-reinforced composite moulding which comprises a surface portion formed from the surfacing layer laminated to a structural portion formed from the at least one layer of dry fibrous reinforcing material and the second resin material, and wherein the sheet material of the surfacing layer has a weight of from 10 to 90 gsm.

23. A method of manufacturing a fibre-reinforced composite moulding, the method comprising the steps of:

(a) disposing a surfacing layer on a portion of a mould surface, the surfacing layer comprising a first resin material and being in a form of at least one solid sheet, the first resin material of the surfacing layer being supported on a carrier of a sheet material, wherein the surfacing layer comprises a plurality of surfacing layer segments assembled together to form a continuous surfacing layer;

(b) disposing at least one layer of dry fibrous reinforcing material on the surfacing layer to provide, on the portion of the mould surface, an assembly of the surfacing layer 9 and a structural layer comprising the at least one layer of dry fibrous reinforcing material;

(c) applying a vacuum to the assembly;

(d) in a vacuum assisted resin transfer moulding step, a resin feed infusion system feeds a liquid resinous compound from a source of such resinous compound into the assembly, the liquid resinous compound comprising a second resin material, wherein the second resin material is infused, under the vacuum, into the at least one layer of dry fibrous reinforcing material; and (e) curing the first and second resin materials to form the fibre-reinforced composite moulding which comprises a surface portion formed from the surfacing layer laminated to a structural portion formed from the at least one layer of dry fibrous reinforcing material and the second resin material, and wherein a ratio of viscosity, measured at 20° C. ambient temperature, of the first resin material and of the second resin material is at least 100/1.

* * * * *

UNITED STATES PATENT AND TRADEMARK OFFICE
CERTIFICATE OF CORRECTION

PATENT NO. : 9,199,431 B2  
APPLICATION NO. : 12/532895  
DATED : December 1, 2015  
INVENTOR(S) : Bannister et al.

Page 1 of 1

It is certified that error appears in the above-identified patent and that said Letters Patent is hereby corrected as shown below:

Title Page

In Item (73) Assignee:
delete "Wright" and replace with --Wight--

In the Claims

In column 17, line 60 (claim 2):
delete "2"

In column 20, line 34 (claim 23):
delete "9"

Signed and Sealed this
Eighth Day of March, 2016

Michelle K. Lee
*Director of the United States Patent and Trademark Office*